United States Patent
Pesce et al.

(10) Patent No.: US 8,875,514 B2
(45) Date of Patent: Nov. 4, 2014

(54) THERMO-ELECTRIC ENGINE

(71) Applicants: John Pesce, Melrose, MA (US); David Pesce, Amherst, MA (US)

(72) Inventors: John Pesce, Melrose, MA (US); David Pesce, Amherst, MA (US)

(*) Notice: Subject to any disclaimer, the term of this patent is extended or adjusted under 35 U.S.C. 154(b) by 9 days.

(21) Appl. No.: 13/711,831

(22) Filed: Dec. 12, 2012

(65) Prior Publication Data

US 2013/0118167 A1  May 16, 2013

Related U.S. Application Data

(62) Division of application No. 12/476,256, filed on Jun. 1, 2009, now Pat. No. 8,353,160.

(60) Provisional application No. 61/057,859, filed on Jun. 1, 2008.

(51) Int. Cl.
*B60K 16/00* (2006.01)
*F03G 6/00* (2006.01)
*F01K 25/00* (2006.01)
*F01D 15/10* (2006.01)
*H02K 7/18* (2006.01)
*F01K 23/06* (2006.01)

(52) U.S. Cl.
CPC .............. *F03G 6/003* (2013.01); *F01K 23/065* (2013.01); *Y02B 10/20* (2013.01); *Y02E 10/46* (2013.01)
USPC ................................ 60/641.8; 60/671; 290/52

(58) Field of Classification Search
USPC ................. 60/641.8, 641.11, 641.15; 290/52
See application file for complete search history.

(56) References Cited

U.S. PATENT DOCUMENTS

| | | | | | |
|---|---|---|---|---|---|
| 3,157,793 | A | * | 11/1964 | Adkins | 290/52 |
| 4,416,116 | A | * | 11/1983 | Kuckens | 60/641.8 |
| 5,419,135 | A | * | 5/1995 | Wiggs | 60/641.15 |
| 5,632,147 | A | * | 5/1997 | Greer | 60/641.15 |
| 6,374,614 | B2 | * | 4/2002 | Prueitt | 60/641.8 |
| 6,434,942 | B1 | * | 8/2002 | Charlton | 60/641.11 |

* cited by examiner

*Primary Examiner* — Christopher Jetton
(74) *Attorney, Agent, or Firm* — O'Connell Law Firm; Thomas P. O'Connell

(57) ABSTRACT

A thermo-electric engine with a working fluid operative in a closed Rankine cycle to enable a harvesting energy from an external source of thermodynamic energy, such as an internal combustion engine or solar energy. The thermo-electric engine can have an evaporator; a turbine fluidically coupled to the evaporator; a heat exchanger comprising a condenser for receiving working fluid from the turbine; a hot liquid input for coupling to a source of heated liquid coolant from an internal combustion engine to the evaporator; a liquid return for returning liquid coolant to the internal combustion engine; a cooling liquid input to the condenser for receiving cooling liquid from a radiator; and a cooling liquid return for returning the cooling liquid to the radiator. Alternatively, a solar energy collector can power a turbine fluidically coupled to the solar energy collector for receiving working fluid.

13 Claims, 7 Drawing Sheets

THERMO-ELECTRIC ENGINE

FIELD OF THE INVENTION

The present invention relates generally to thermodynamic systems and methods. More particularly, disclosed herein is a thermo-electric engine for harvesting and exploiting useful power from an external source of thermodynamic energy, such as heated liquid coolant circulating through an internal combustion engine or liquid heated through solar heat gain.

BACKGROUND OF THE INVENTION

Despite attempts to develop alternative and hybrid sources of propulsion, the motor vehicle industry remains dependent on the internal combustion engine for propelling the cars and trucks that have already been placed in service and those that are currently being produced. Although internal combustion engines and the associated components of vehicular drive systems have improved in efficiency, the input-to-output efficiency of internal combustion engines remains low.

The exothermic reaction of the internal combustion process creates gases at high temperature and pressure that can be translated into work, namely by driving the pistons of the engine. However, only a portion of the available energy is harvested and the remaining hot gases are vented to allow the piston to return to its previous position. Consequently, a significant percentage of energy in the form of waste heat is discharged to the atmosphere as hot exhaust gas and a further percentage must be removed from the engine through an air or liquid cooling system. Indeed, the exhaust and cooling systems have as their fundamental purpose the removal of waste heat that could not be exploited to produce work by the internal combustion engine.

Research has found that, out of the total power available in the consumed fuel, only approximately thirty percent of the gross available energy actually produces drive power as is shown in FIG. 1. Roughly thirty percent of the energy is simply exhausted by the exhaust system, and about the same percentage is removed by the cooling system. Furthermore, approximately another ten percent is employed to operate engine accessories such as the air conditioner, the fan, and the transmission. Even the roughly thirty percent of available energy that is directed to drive power is reduced by friction and other losses so that even less energy actually reaches the road surface.

Since there are millions of automobiles and trucks in use every day that together consume hundreds of millions of gallons of gasoline and diesel fuel annually, the amount of fuel that is effectively given off as waste heat is staggering. The lost energy contributes to mankind's dependence on fossil fuels and represents significant economic loss to individual consumers and society in general while having a deleterious effect on the environment. Consequently, it will be appreciated that an improvement in the efficiency of the internal combustion engine would represent significant benefits economically and environmentally while lessening the impact of vehicle usage on available petroleum resources.

Advantageously, a number of inventors have sought to provide methods and systems for harvesting the otherwise wasted heat from the internal combustion process. For example, in U.S. Pat. No. 4,224,797, Kelly discloses a steam turbine and power system that employs a closed Rankine cycle with a conical Tesla turbine. The system is said to be beneficial based on the efficiency of the Rankine cycle, quiet operation, few rotating parts, and reduced maintenance requirements in comparison to internal combustion engines. However, the power system in Kelly acts as the entire drive system for the automobile. Consequently, the system is difficult or impossible to apply to pre-existing vehicles. Furthermore, it is incompatible with internal combustion engines and, consequently, cannot practically be used to improve their efficiency.

In U.S. Pat. No. 5,000,003, Wicks teaches a combined cycle engine that seeks to provide improved fuel efficiency over liquid cooled internal combustion engines through the recovery of the engine's heat that would normally be ejected through the engine coolant radiator and the exhaust system. The energy harvesting aspect of the combined cycle engine operates under a Rankine cycle that requires a coolant pump, a super heater, a boiler, a feed heater, a turbine or other type of power producing vapor expander, an air cooled condenser, and a condensate feed pump. While Wicks expects markedly improved efficiency from such an arrangement, the system is highly complex and would require significant modification of existing systems or redesigned future systems to be able to be put into practice.

Even further, with U.S. Patent Application Publication No. 2007/0007771, Biddle et al. disclose a system for recovering waste heat from an internal combustion engine that again uses a closed Rankine cycle. Biddle et al. contemplate a system with specific relative temperatures as fluid advances from a first heat exchanger to an expansion unit. An electromechanical conversion unit is coupled to the expansion unit for converting mechanical energy to electrical energy. A cooling system is coupled to the expansion unit and the first heat exchanger for receiving and cooling fluid and supplying the fluid to the heat exchanger. Disadvantageously, however, operation of the system demands a multiphase process to heat the working fluid and a special turbine system involving a unique bearing and vane design. Furthermore, the turbine is coupled to the electromechanical conversion unit by a magnetic coupler such that the alternator is maintained separate and outside the working fluid of the recovery system.

In light of the foregoing, it will be appreciated that, despite the useful contributions of the inventors of the prior art, there remains a need for an auxiliary system for harvesting waste heat from the internal combustion process in automobiles that is efficient in structure and operation and readily adaptable to existing internal combustion engines thereby improving the input-to-output efficiency of the propulsion system and allowing a conservation of resources and concomitant economic and environmental benefits.

Unfortunately, internal combustion engines are not the only area of technology where available energy is incompletely harvested. For example, solar energy, although freely available, is almost entirely ignored. It simply heats the surfaces on which it falls with no intentional retrieval of its energy. While solar heat usefully imparts heating energy on buildings and other structures in colder conditions, it has a deleterious heating effect during summer months.

Accordingly, there has been a recognized and longfelt need for a system capable of retrieving useful energy from incident solar rays. Based on that need, solar heat systems and methods have been developed for application to rooftops and elsewhere for making use of the Sun's rays. For example, solar arrays have been developed that exploit the energy of the Sun to heat circulating water to provide some or all of a building's hot air and heated water. Furthermore, photovoltaic arrays have been developed for converting the Sun's energy to electrical energy. Over time, these systems have demonstrated improved efficiency and have been refined with the goal of providing the affordability required for widespread use.

Despite the improvements in systems and methods in the prior art, there remains a need for improved systems for harvesting solar energy. There remains a need for a system that is efficient and reliable in operation. Furthermore, there is a need for a system that can convert solar energy to useful work and power that is efficient in construction in a manner that permits its ready and cost effective application in a wide variety of environments.

SUMMARY OF THE INVENTION

With an appreciation for the needs that have been left by the prior art, the present inventors set forth with the basic object of providing a system and method for harvesting and exploiting useful energy from an external source of thermodynamic energy, such as solar energy or waste heat from an internal combustion engine.

A more particular object of certain embodiments of the invention is to provide a system and method for harvesting useful energy from an internal combustion engine in a motor vehicle to improve the overall efficiency of the internal combustion process and thereby to increase the percentage of chemical potential energy exploited to produce, among other things, drive power.

A particular object of alternative embodiments of the invention is to provide a system and method for harvesting solar energy in an efficient manner and under an efficient and cost-effective construction thereby to enable useful and potentially widespread application.

A more particular object of the invention is to utilize presently wasted heat energy generated by the engine to supplement the basic engine efficiency, thereby effecting a saving of fuel consumed by the engine or permitting the use of a smaller engine for a required power output.

A related object of the invention is to provide a thermo-electric engine that conserves fuel resources thereby to produce economic and environmental benefits for the individual consumer and society as a whole.

A further object of embodiments of the invention is to provide a system and method for harvesting useful energy from what would otherwise constitute waste heat from the internal combustion process to power an otherwise parasitic system component, such as an automotive alternator.

An object of alternative embodiments of the invention is to provide a system and method for harvesting useful energy from incident solar rays that would otherwise be wasted or that would otherwise impart undesired heat onto a building structure.

These and further objects and advantages of embodiments of the invention will become obvious not only to one who reviews the present specification and drawings but also to one who has an opportunity to observe an embodiment of the present invention for a thermo-electric engine in operation. It will be appreciated that, although the accomplishment of each of the foregoing objects in a single embodiment of the invention may be possible and indeed preferred, not all embodiments will seek or need to accomplish each and every potential object and advantage. Nonetheless, all such embodiments should be considered within the scope of the present invention.

DETAILED DESCRIPTION OF PREFERRED EMBODIMENTS

It will be appreciated that the thermo-electric engine described herein can pursue widely varied embodiments and applications. However, to ensure that one skilled in the art will be able to understand and, in appropriate cases, practice the present invention, certain preferred embodiments of the broader invention revealed herein are described below and shown in the accompanying drawing figures. Before any particular embodiment of the invention is explained in detail, it must be made clear that the following details of construction, descriptions of geometry, and illustrations of inventive concepts are mere examples of the many possible manifestations of the invention.

Figure 3:
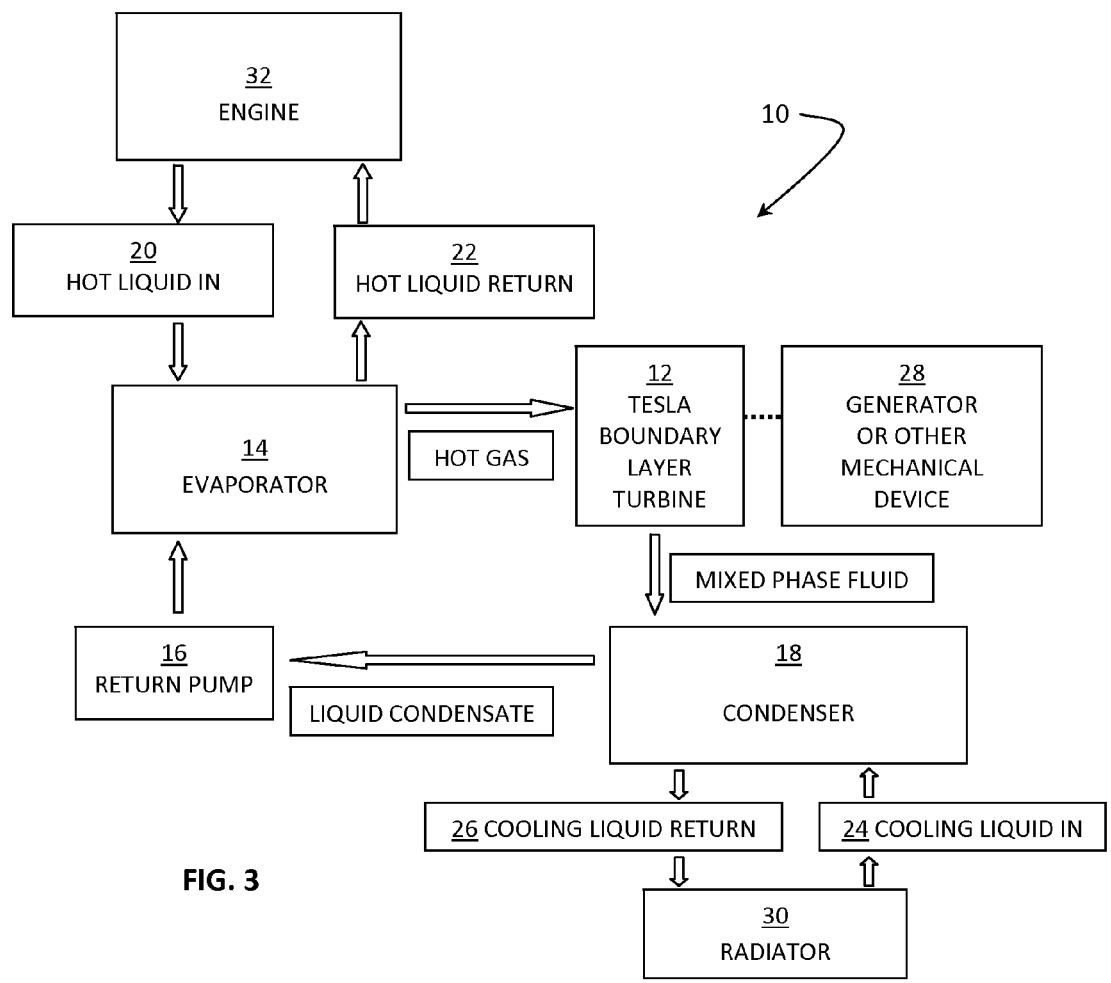
FIG. 3 is a schematic view of a thermo-electric engine pursuant to the present invention employed in relation to an internal combustion engine.

Looking more particularly to the drawings, a first embodiment of a thermo-electric engine pursuant to the invention disclosed herein is indicated generally at 10 in FIG. 3. As will be described more fully hereinbelow, the thermo-electric engine 10 is operative in a closed organic Rankine cycle to enable the harvesting of waste heat from an internal combustion engine 32 in a motor vehicle to produce useful power. The thermo-electric engine 10 thus improves the overall efficiency of the internal combustion process by increasing the percentage of potential chemical energy that is usefully exploited from that available in the burned fuel.

Figure 1:
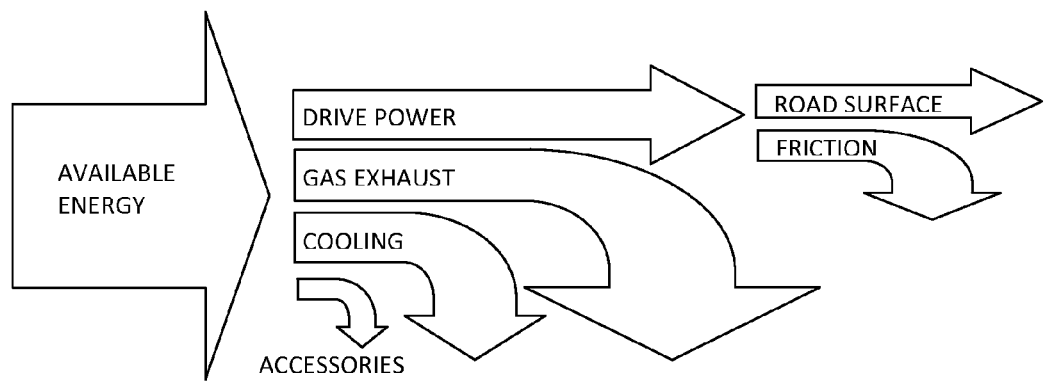
FIG. 1 is a flow diagram approximating the division of available chemical potential energy under the prior art.
Figure 2:
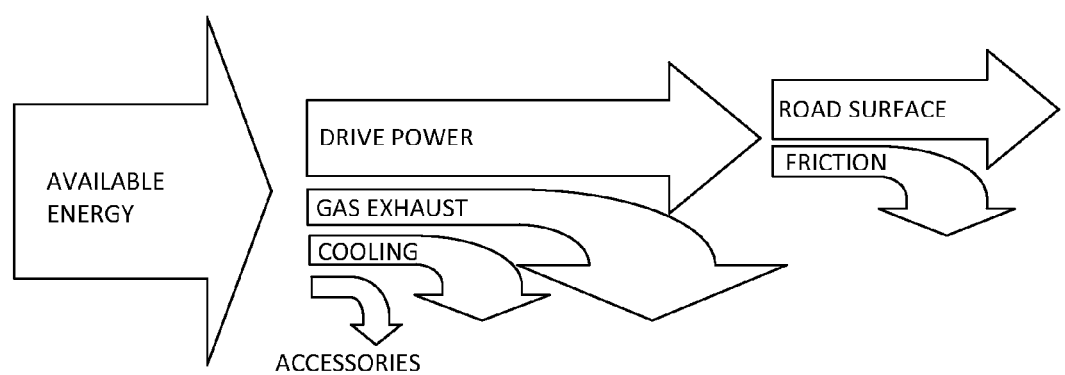
FIG. 2 is a flow diagram depicting improvements in the efficiency of the division of available potential energy pursuant to the present invention.

These improvements in the efficiency of the internal combustion process can be employed to increase the available potential energy that is actually exerted as drive power on the road surface as suggested by the flow diagrams of FIGS. 1 and 2. The thermo-electric engine 10 thereby reduces wasted energy and improves fuel economy. It should be noted that FIGS. 1 and 2 and, more particularly, the differences therebetween may not necessarily represent actual results of the use of embodiments of the present invention. Instead, they are merely intended to make clear the important advantages that could be gained by exploitation of embodiments of the present invention for a thermo-electric engine 10.

As shown in FIG. 3, the thermo-electric engine 10 includes a heat exchanger in the form of an evaporator 14. The evaporator 14 is fluidically coupled to a turbine 12 or other means for converting the movement of fluid received from the evaporator 14 into usable energy, such as electricity. The turbine 12 is fluidically connected to a heat exchanger in the form of a condenser 18. Finally, a return pump 16 is fluidically interposed between the condenser 18 and the evaporator 14 thereby to form a complete, closed loop through which working fluid passes as described further hereinbelow. The return pump 16 can be unidirectional thereby ensuring fluid will only pass through the thermo-electric engine 10 as indicated by the directional arrows of FIG. 3.

A hot liquid input 20 supplies heated liquid coolant from the internal combustion engine 32 to the evaporator 14. The heated liquid coolant flows through a heating coil within the evaporator 14 to add heat to the working fluid before being returned to the cooling jacket of the engine 32 through a liquid return 22. The hot liquid input 20 and the liquid return 22 can each comprise a hose, a pipe, a tube, or any other conduit, a direct coupling, or any other means for creating a fluidic association.

A cooling liquid input 24 can supply cooling liquid to the condenser 18 from an external fluid supply. Cooling liquid can pass through a cooling coil within the condenser 18 to remove heat from the working fluid before being passed from the condenser 18 through a cooling liquid return 26. In certain embodiments, the cooling liquid can be received from and returned to a radiator 30, which can comprise a pre-existing automobile radiator or a dedicated system for removing heat from the cooling liquid and, through the cooling liquid, the working fluid of the thermo-electric engine 10. Again, the cooling liquid input 24 and the cooling liquid return 26 can comprise any means for creating a fluidic connection, including, by way of example, hoses, pipes, tubes, or any other conduit or, potentially, a direct coupling.

With the turbine 12, the condenser 18, the return pump 16, and the evaporator 14 so arranged, the working fluid can exploit the heat supplied to the closed loop from the internal combustion engine 32 to produce work under the Rankine thermodynamic cycle. The working fluid is reused constantly, and the waste heat is essentially reduced to that removed from the working fluid in the condenser 18.

Figure 4:
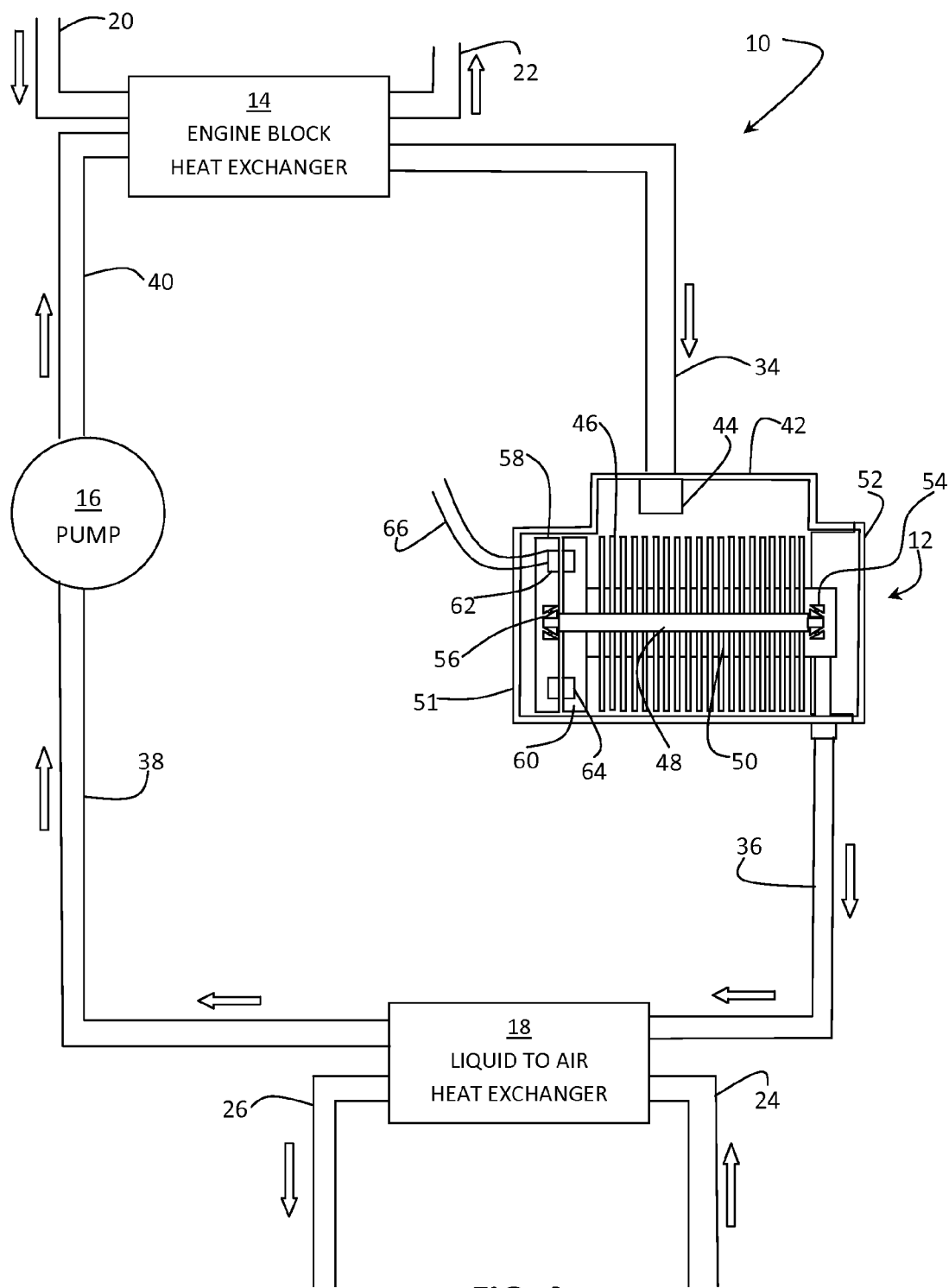
FIG. 4 is a partially sectioned view of a thermo-electric engine according to the present invention employing a Tesla boundary layer turbine and again applied in relation to an internal combustion engine.
Figure 5:
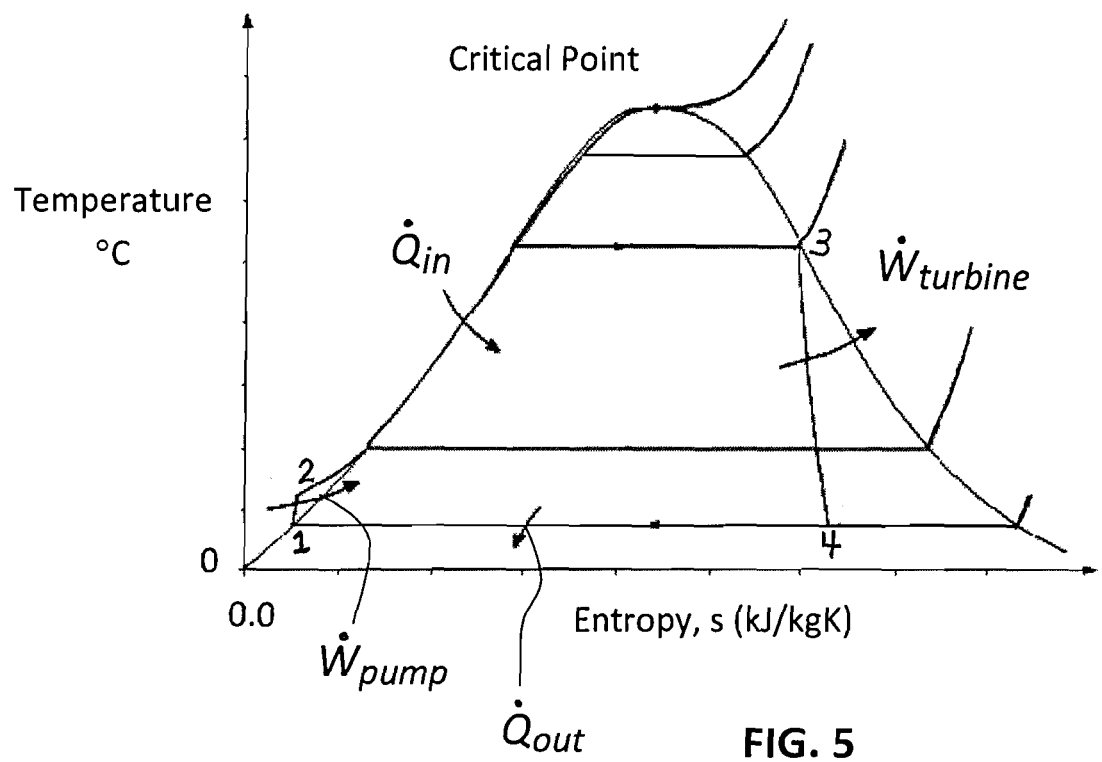
FIG. 5 is a T-s diagram for a typical Rankine thermodynamic cycle.

The Rankine cycle under which the thermo-electric engine 10 operates can be better understood with reference to the T-s diagram shown in FIG. 5. Under the Rankine cycle, there are four processes. Each process brings about a change in the state of the working fluid as identified by the numbers in the diagram of FIG. 5. In Process 1-2, the working fluid, which may be in liquid form at this state, is pumped by the return pump 16 from low to high pressure. Since the fluid is in liquid form, relatively little input energy is required from the pump 16. In Process 2-3, the pressurized working fluid enters the evaporator 14 where it is heated at constant pressure by the heat received from the heated liquid coolant received from the internal combustion engine 32. Through the added heat, the working fluid becomes a dry saturated vapor. In Process 3-4, the dry saturated vapor expands through the turbine 12 thereby inducing a rotation of the turbine shaft 48, which is shown in FIG. 4, to generate power. The rotation of the turbine with the concomitant generation of power decreases the temperature and pressure of the working fluid. The working fluid, which may now comprise a wet vapor, then undergoes Process 4-1 where the working fluid enters the condenser 18 where the cooling liquid removes heat from the working fluid. The condenser 18 has cooling coils that fix the pressure and temperature of the working fluid as the fluid undergoes a phase change to saturated liquid.

Since the compression of the working fluid by the pump 16 and the expansion of the working fluid in the turbine 12 are not isentropic, these processes are non-reversible. Entropy is increased during each process. Consequently, the power required by the pump 16 is increased in relation to an ideal cycle, and the power generated by the turbine 12 is reduced in comparison to an ideal cycle.

In general, the thermodynamic efficiency of the Rankine cycle can be calculated as the ratio of net power output to heat input according to Equation 1 below.

$$\eta_{therm} = \frac{\dot{W}_{turbine} - \dot{W}_{pump}}{\dot{Q}_{in}} \approx \frac{\dot{W}_{turbine}}{\dot{Q}_{in}} \qquad \text{Equation 1}$$

Where:
$\dot{Q}$ Is the eat flow rate to or from the system (energy per unit time);
$\dot{W}$ Is the Mechanical power consumed by or provided to the system (energy per unit time); and
$\eta_{therm}$ Is the thermodynamic efficiency of the process (net power output per heat input, dimensionless).

The thermodynamic performance of one particular example of a thermo-electric engine 10 operating pursuant to the present invention can be further understood with reference to FIG. 6 and to the calculations set forth below. In those calculations, all components are assumed to be operating at steady state, and all processes are assumed to be internally reversible. For convenience, the turbine 12 and the pump 16 are assumed to be adiabatic with no heat lost from either component. Still further, kinetic effects are ignored as is gravitational potential energy. It is further assumed that saturated vapor enters the turbine 12 and that saturated liquid leaves the condenser 18.

The reference characters in the ensuing formulas are employed as follows:
$h_A$ is the specific enthalpy of State A,
$s_A$ is the specific entropy of State A,
$v_A$ is the specific volume of State A,
$p_A$ is the pressure of State A,
$\dot{W}_t$ is the power output of the turbine component,
$\dot{W}_p$ is the power output of the turbine component,
$\dot{Q}_{in}$ is the heat flow into the system,
$\dot{m}$ is the mass flow rate of the system,
$\eta$ is the thermal efficiency of the system.

Figure 6:
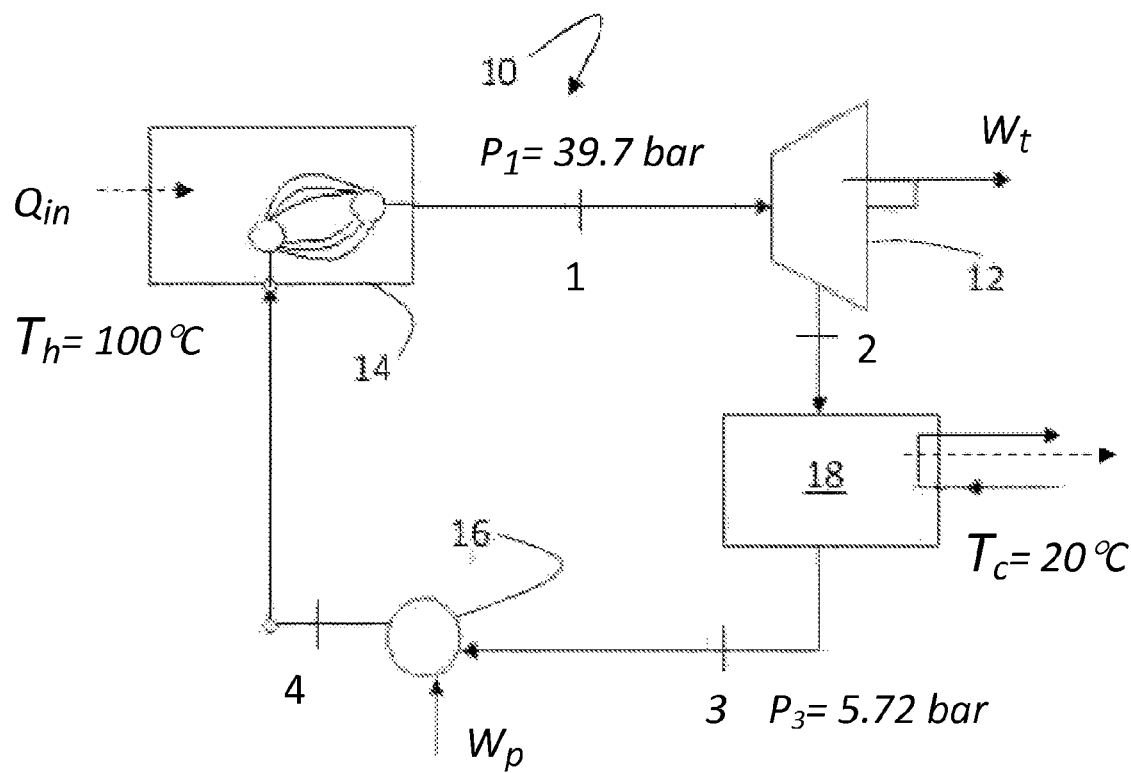
FIG. 6 is a schematic view of a thermo-electric engine according to the invention disclosed herein.

At State 1, the specific enthalpy $h_1$ of the thermo-electric engine 10 of FIG. 6 can be determined to be 259. kJ/kg, and the specific entropy $s_1$ can be determined to be 0.812 kJ/kg·K. In each case and hereinbelow, the calculations rely on known thermodynamic values, namely Table A-10 of Fundamentals of Engineering Thermodynamics—$3^{rd}$ Ed., Moran, Michael J. and Howard N. Shapiro, John Wiley and Sons, Inc.: United States of America, 1996.

At State 2, the specific entropy $s_2$ would equal the specific entropy $s_1$ at State 1 such that it would again be 0.812 kJ/kg·K. The specific enthalpy $h_2$ would be determined pursuant to Equation 2 below.

$$h_2 = h_f + x_2 h_{fg} \qquad \text{Equation 2}$$

Therefore, one must find $x_2$, which can be determined using Equation 3 below.

$$x_2 = \frac{s_2 - s_f}{s_g - s_f} \qquad \text{Equation 3}$$

With $s_2$ known, one can find $s_f$ and $s_g$ again from known thermodynamic values, such as Table A-10 of Moran's Fundamentals of Engineering Thermodynamics. Assuming State 2 is at the same pressure as State 3 ($p_2 = p_3 = 5.72$ bar), one can proceed under Equations 4 through 7.

$$s_f = 0.292 \frac{kJ}{kg \cdot K} \qquad \text{Equation 4}$$

$$s_g = 0.91 \frac{kJ}{kg \cdot K} \qquad \text{Equation 5}$$

$$\Rightarrow x_2 = \frac{s_2 - s_f}{s_g - s_f} = 0.841 \qquad \text{Equation 6}$$

$$\Rightarrow h_2 = 229.6 \frac{kJ}{kg} \qquad \text{Equation 7}$$

Upon reaching State 3, the working fluid takes the form of a saturated liquid at 5.72 bar, and the specific enthalpy $h_3$ can be determined to be 77.3 kJ/kg.

Finally, the conditions at State 4 are fixed by the evaporator pressure $p_4$ and the specific entropy $s_4$, which equals the specific entropy $s_3$ at State 3. The specific enthalpy $h_3$ can be found by interpolation of compressed liquid thermodynamic tables. However, such data is sparse. Therefore, it is more convenient to solve by approximating the work done by the pump as in Equations 8 through 10, again with reference to Table A-10 of Moran's Fundamentals of Engineering Thermodynamics.

$$h_4 = h_3 + \frac{\dot{W}}{\dot{m}} = h_3 + v_3(p_4 - p_3) \quad \text{Equation 8}$$

$$v_3 = 0.816 \times 10^{-13} \frac{m^3}{kg} \quad \text{Equation 9}$$

$$\Rightarrow h_4 = 77.3 \frac{kJ}{kg} \quad \text{Equation 10}$$

The net power output for the thermo-electric engine 10 can be determined according to Equations 11 through 16.

$$\dot{W}_{cycle} = \dot{W}_i - \dot{W}_p \quad \text{Equation 11}$$

$$\dot{W}_i = \dot{m}(h_1 - h_2) = \dot{m}(259.1 - 229.6)\frac{kJ}{kg} \quad \text{Equation 12}$$

$$\Rightarrow \dot{W}_i = 29.5 \cdot \dot{m} \frac{kJ}{kg} \quad \text{Equation 13}$$

$$\dot{W}_p = \dot{m}(h_4 - h_3) = \dot{m}(77.3 - 77.3)\frac{kJ}{kg} \quad \text{Equation 14}$$

$$\Rightarrow \dot{W}_p = 0 \quad \text{Equation 15}$$

$$\boxed{\Rightarrow \dot{W}_{cycle} = 29.5 \cdot \dot{m} \frac{kJ}{kg}} \quad \text{Equation 16}$$

Finally, the thermal efficiency of the thermo-electric engine 10 can be determined employing Equations 17 through 21.

$$\eta = \frac{\dot{W}_{cycle}}{\dot{Q}_{in}} \quad \text{Equation 17}$$

$$\text{Where } \dot{Q}_{in} = \dot{m} \cdot (h_1 - h_4) = \dot{m} \cdot (259.2 - 77.3)\frac{kJ}{kg} \quad \text{Equation 18}$$

$$\dot{Q}_{in} = 181.9 \cdot \dot{m} \frac{kJ}{kg} \quad \text{Equation 19}$$

$$\eta = \frac{\dot{W}_{cycle}}{\dot{Q}_{in}} = \frac{29.5 \cdot \dot{m}}{181.9 \cdot \dot{m}} \quad \text{Equation 20}$$

$$\boxed{\Rightarrow \eta = 0.162 = 16.2\%} \quad \text{Equation 21}$$

It will be appreciated that the thermodynamic cycle contemplated hereunder will operate over a relatively low temperature range in comparison to certain other Rankine cycles since the operating range is essentially dictated by the cooling liquid received from the internal combustion engine. Consequently, the cycle can comprise an organic Rankine cycle where an organic fluid, such as pentane or butane, is employed in place of the water and steam circulating in higher temperature cycles. Other fluids capable of undergoing the Rankine cycle over the temperature range provided by the internal combustion engine may be possible and are well within the scope of the present invention.

With further reference to FIG. 4, the turbine 12 can be seen to be fluidically connected to the condenser 18 by a conduit 36. Fluid flows from the condenser 18 to the pump 16 through a conduit 38 and from the pump 16 into the evaporator 14 through a conduit 40. Finally, fluid can be passed from the evaporator 14 into the turbine 12 through a conduit 34. Again, the conduits 34, 36, 38, and 40 can be of any effective type.

The turbine 12 employed in the thermo-electric engine 10 can also be of a wide variety of types that now exist or may hereafter be developed. In one presently contemplated embodiment, the turbine 12 can be a Tesla turbine 12. The Tesla turbine 12 can have a casing 42 with an endplate 51 to a first end thereof and an endplate 52 to a second end thereof. A plurality of smooth disks 46 with spacers 50 therebetween can be retained, such as by keying, non-circular formation of the shaft 48, or other methods, to rotate with the turbine shaft 48. The disks 46 and spacers 50 will, of course, ideally be well balanced to ensure stable operation of the turbine 12. To facilitate proper balancing, a post-assembly turning or skim cutting of the disks 46 can be performed. The turbine shaft 48 is supported at first and second ends by high speed rotational bearing arrangements 54 and 56.

One or more nozzles 44 applies the working fluid in the form of a dry saturated vapor received from the evaporator 14 in Process 3-4 to the edges of the disks 46. The moving gas drags on the disks 46 through viscosity and through the adhesion of the surface layer of the gas on the disks 46. As rotational energy is added to the disks 46, the gas slows down and is eventually exhausted through the conduit 36. In certain embodiments, the turbine 12 can be unidirectional with a single nozzle 44 disposed to impart working fluid tangentially to only a single side of the disks 46. At least the interior of the case 42 can be round in cross section, and the working fluid can exit the turbine 12 through an exhaust port in the endplate 52.

The rotating mechanical energy produced by the rotating turbine shaft 48 can be harvested, such as by being converted to electrical energy by an alternator arrangement. A separate alternator (not shown) could in theory be provided. Alternatively, as FIG. 4 shows, the alternator components can be incorporated into the turbine casing 42. A stator 58 can be retained in a stationary disposition within the casing 42, and a rotor 60 can be retained to rotate with the shaft 48. The rotor 60 has magnets 64 retained relative thereto, and the stator 58 has a set of coils 62 in proximity to the rotor 60. Under this arrangement, rotation of the turbine shaft 48 will yield a rotation of the rotor 60. As the rotor 60 turns, the magnetic field of the rotor magnet 64 sweeps through the stator winding coils 62 to producing an alternating electrical current in the coils 62. That electrical current can be passed through wiring 66 to be otherwise exploited or stored.

Figure 9:
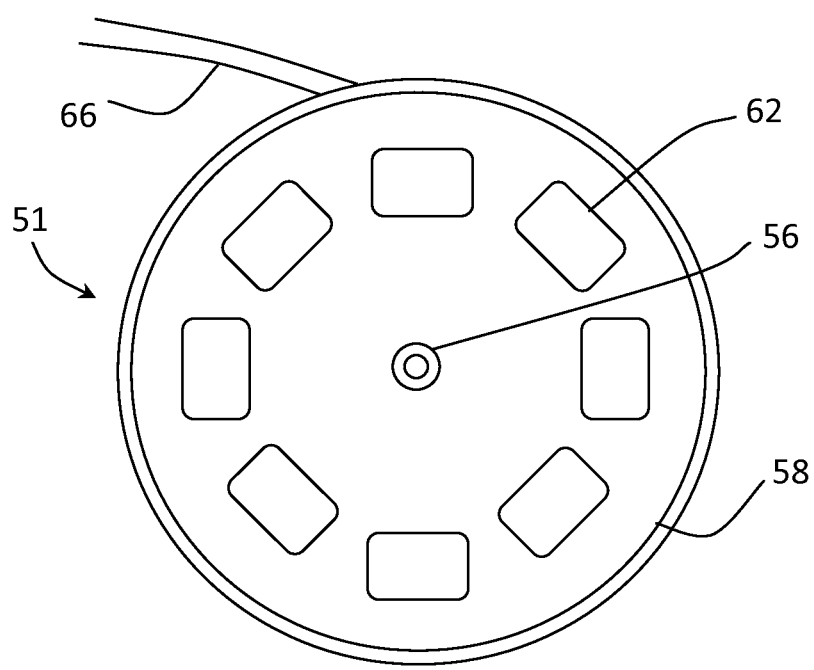
FIG. 9 is a view in front elevation of an embodiment of an end cap of the turbine as disclosed herein.

In one contemplated embodiment, as depicted in FIG. 9, the end cap 51 at the first end of the turbine 12 can operate as the stator 58 by having the coils 62 radially spaced on the inside face of the end cap 51. The coils 62 could be coupled to the end cap 51 in any appropriate manner. For example, a bed of epoxy or other adhesive material could be applied to the proximal face of the end cap 51, the coils 62 could then be applied thereto, and, possibly, the interstitial adhesive could be removed. The wiring 66 can pass directly through apertures in the end cap 51.

The rotor 60 can be founded on a flat plate. A plurality of boreholes, which can extend partially or entirely through the plate, can be formed in the plate in a radially spaced configuration. The magnets 64 can be received into the boreholes and retained thereto in any effective manner, including, by way of example, press fitting, mechanical fasteners, adhesive, or any combination thereof. The magnets 64 can be disposed to be level with the distal face of the plate, possibly with a finishing operation to present a flat distal surface. In certain cases, a protective disk, which could be formed from a non-conductive metal, can overly the magnets 64 and the plate.

The performance of thermo-electric engines 10 operative under the present invention will vary widely depending on numerous factors, including the internal combustion engine or other source of thermodynamic energy to which the thermo-electric engine 10 is coupled, the operating conditions, and the construction of the thermo-electric engine 10. Embodiments are contemplated to have a desired operating rotational velocity of the turbine shaft 48 of 20,000 rpm, which could produce useful horsepower from heat that would have otherwise been exhausted. The thermo-electric engine 10 could incorporate a throttle or other means for preventing excessive rotational speed in the turbine 12. A bypass valve could be provided to reduce or otherwise adjust incoming fluid flow from the hot liquid input 20 from the engine 32, such as to achieve desired rotational velocity in the turbine 12 or in the event of a malfunction in the thermo-electric engine 10.

With respect to vehicular applications, the present inventors have appreciated that broad applicability of the thermo-electric engine 10 will hinge not only on its ability to harvest otherwise wasted energy but also on the readiness that vehicles may be equipped, whether by retrofitting or upon initial production. To that end, embodiments of the thermo-electric engine 10 can be substantially self-contained as shown in the partially cross-sectioned view of FIG. 7. There, the turbine 12, the condenser 14, the pump 16, the evaporator 18, and the various conduits interconnecting the same and connecting the evaporator 18 with the engine (not show in FIG. 7) and the condenser 14 with the radiator (not shown in FIG. 7) or other cooling system are housed within a shell 68, which is partially sectioned away in FIG. 7. In addition to housing the components of the thermo-electric engine 10, the shell 68 can have or be formed with a casing 70 in the inner volume thereof enveloping some or all of the system components. The casing 70 could be formed from an insulative material, such as a suitably chosen foam, high temperature thermal barrier material, insulative ceramic, or any other material. The casing 70 can thus improve the efficiency and, potentially, the durability and portability of the thermo-electric engine 10.

Figure 7:
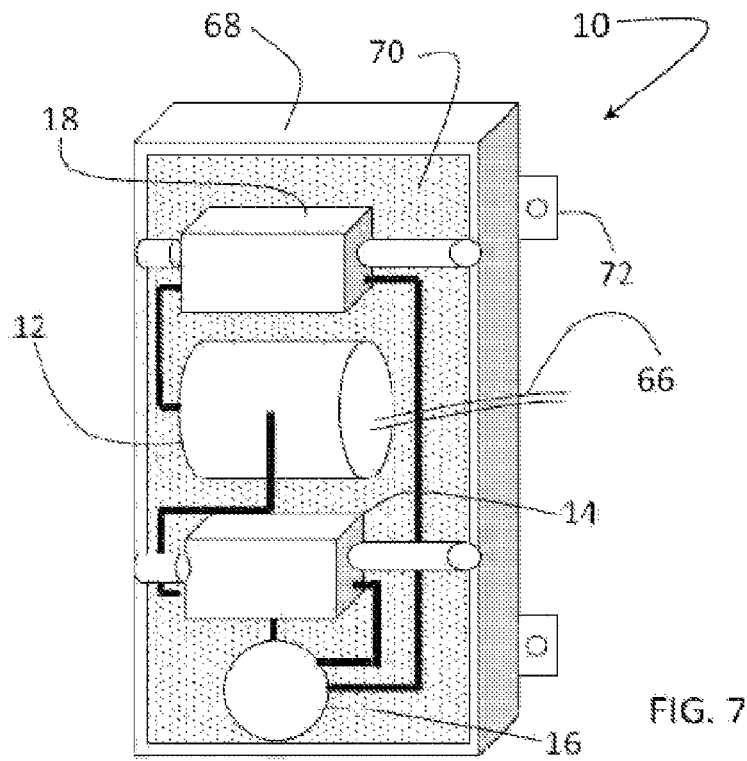
FIG. 7 is a partially cross-sectioned perspective view of a substantially self-contained thermo-electric engine pursuant to the teachings hereof.

To facilitate the ready attachment of the thermo-electric engine 10 to the infrastructure of a vehicle, appropriate connecting means can be provided. For example, as FIG. 7 shows, flanges 72 can project from the shell 68 to enable the retention of the thermo-electric engine 10 using mechanical fasteners, welding, or other means. The shell 68 and the thermo-electric engine 10 in general thus can be readily retrofitted to a pre-existing vehicle or incorporated into a vehicle on initial manufacture. Thermo-electric engines 10 can be configured and specified for particular vehicles or can be designed for nearly universal applicability. Adaptability of the thermo-electric engine 10 can be promoted by the provision of particularized hose attachment arrangements for fluidically coupling the evaporator 18 and the condenser 14 into various vehicle designs.

Figure 8:
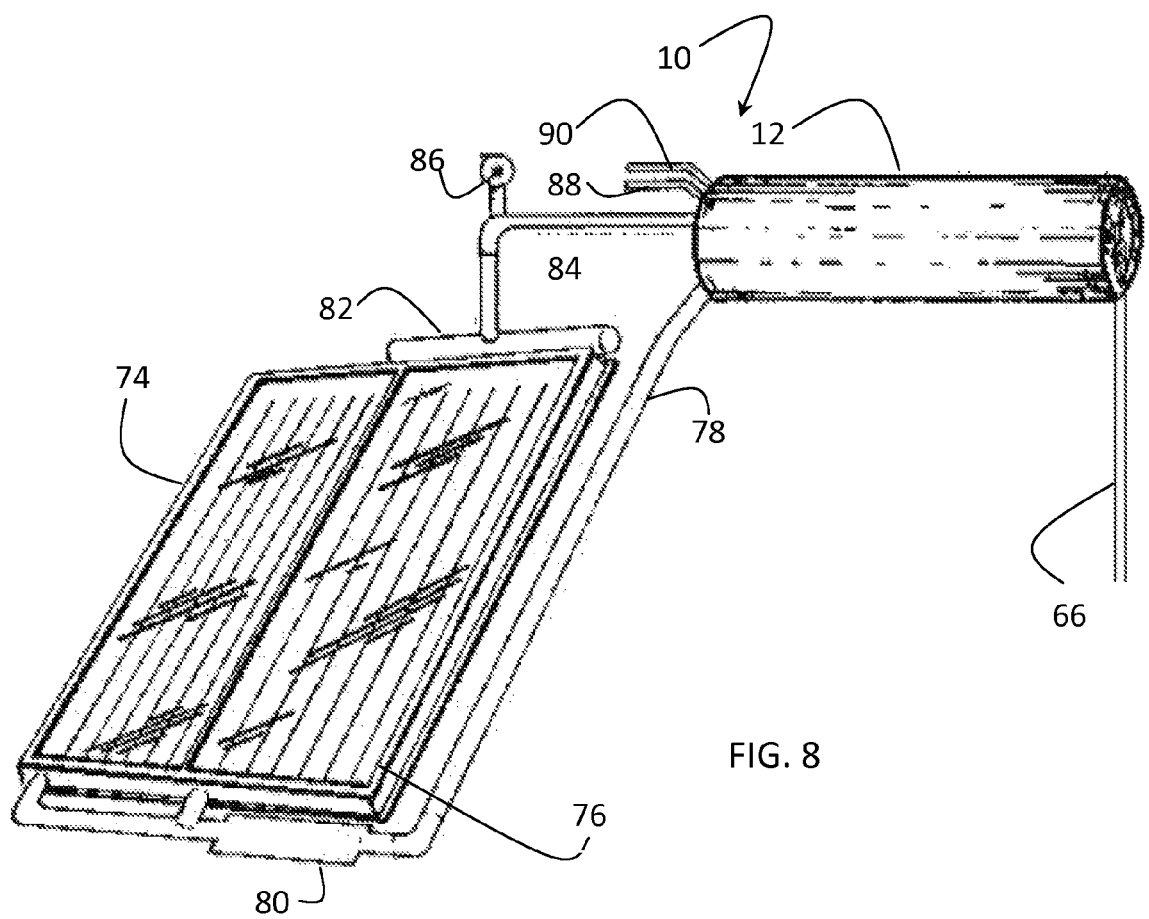
FIG. 8 is a perspective view of an alternative thermo-electric engine employed in relation to first and second solar collectors.

The present inventors have additionally conceived of employing thermo-electric engines 10 according to the present invention to harvest power from other sources of thermodynamic energy. One such alternative embodiment of the thermo-electric engine 10 is depicted in FIG. 8 where a working fluid again undergoes a closed-loop thermodynamic cycle. First and second solar energy collectors 74 and 76 receive incident solar energy to heat the working fluid and thereby to drive the thermodynamic cycle.

Through that thermodynamic cycle, the solar energy collectors 74 and 76 operate an energy-harvesting turbine 12 or other means for converting the movement of the fluid received from the solar energy collectors 74 and 76 to usable energy, such as electricity. The working fluid can leave the solar energy collectors 74 and 76 as a vapor and can then enter the turbine 12 through an insulated manifold 82 and then a vapor line 84 to induce a rotation of the turbine 12. The turbine 12 can be constructed essentially as described above in relation to the vehicular application. To ensure proper operation of the turbine 12 in receiving the working fluid in vapor form, the turbine 12 is preferably disposed above the solar energy collectors 74 and 76. A pressure gauge and valve arrangement 86 can operate as a safety cutoff to prevent excess pressure in the system. The rotation of the turbine 12 can produce electrical energy. The harvested electrical energy can then be transmitted for storage or direct usage, such as through electrical wiring 66.

The working fluid can additionally be brought back to liquid form within a desired temperature range by the circulation of building supply water that can enter the turbine 12 or a dedicated condenser (not shown) through a water supply line 88. The building supply water will then be heated by thermodynamic exchange with the working fluid, which in turn will be cooled. Once heated, the building supply water can be returned through a return line 90 to a water storage tank (not shown) or for direct usage for a building's hot water needs. Once condensed, the working fluid can return to the solar energy collectors 74 and 76 through a return liquid line 78, which can be insulated.

A condensate return pump 80 can be interposed between the turbine 12 and the solar energy collectors 74 and 76 to pump the working fluid as necessary. With this, a complete, closed loop is formed through which working fluid passes continuously. The return pump 80 can be unidirectional thereby ensuring fluid will only pass through the thermo-electric engine 10 as described. Therefore, during operation of the thermo-electric engine 10, heat is added to the working fluid through incident solar rays, and energy is harvested from the heated working fluid by the turbine 12. The vapor line 84 and the liquid return line 78 can each comprise a hose, a pipe, a tube, or any other conduit, a direct coupling, or any other means for creating a fluidic association.

The water supply line 88 can thus provide cooling liquid from an external fluid supply, and that cooling liquid can be heated to further reduce energy consumption needs of the building. The cooling liquid can pass through a cooling coil within a condenser or within the turbine 12 structure to remove heat from the working fluid before being passed through the liquid return line 78. The cooling liquid input 88 and the cooling liquid return 90 can comprise any means for creating a fluidic connection, including, by way of example, hoses, pipes, tubes, or any other conduit or, potentially, a direct coupling.

With the turbine 12 and the solar energy collectors 74 and 76 so arranged, the working fluid can exploit the heat supplied to the closed loop from the solar rays to produce work under the Rankine thermodynamic cycle. The working fluid is reused constantly in a potentially self-pumping arrangement, and solar energy that would otherwise be wasted is exploited to produce electrical energy and to add useful heat to building supply water.

The thermodynamic cycle will again operate over a relatively low temperature range in comparison to certain other Rankine cycles. Consequently, the cycle could comprise an organic Rankine cycle where an organic fluid, such as pentane or butane, is employed in place of the water and steam circulating in higher temperature cycles. Other fluids capable of undergoing the Rankine cycle over the temperature range provided by the internal combustion engine may be possible and are well within the scope of the present invention.

In further embodiments of the invention, the working fluid could comprise a refrigerant, such as R-114 refrigerant, to facilitate a highly efficient closed-loop system. R-114 refrigerant is commercially known under the registered trademarks FREON 114 from DuPont, GENETRON 114 from Union Carbide, and others. Using such a refrigerant as the working fluid, the system can thus be rendered essentially freeze proof and non-corroding. The preferred refrigerant demonstrates a −137 degree Fahrenheit freezing point to ensure frees protection and a boiling point of 39 degrees Fahrenheit where the fluid changes phase to a vapor. The phase change characteristic of the refrigerant provides important operational advantages to the system.

As described previously, the turbine 12 can be a Tesla turbine 12 as was shown and described in FIG. 4. The Tesla turbine 12 can again have a casing 42 with an endplate 51 to a first end thereof and an endplate 52 to a second end thereof.

A plurality of smooth disks 46 with spacers 50 therebetween can be retained, such as by keying, non-circular formation of the shaft 48, or other methods, to rotate with the turbine shaft 48. The turbine shaft 48 is supported at first and second ends by high speed rotational bearing arrangements 54 and 56.

One or more nozzles 44 again applies the working fluid in the form of a dry saturated vapor received from the solar energy collectors 74 and 76 to the edges of the disks 46. The moving gas drags on the disks 46 through viscosity and through the adhesion of the surface layer of the gas on the disks 46. As rotational energy is added to the disks 46, the gas slows down and is eventually exhausted through the conduit 36. In certain embodiments, the turbine 12 can be unidirectional with a single nozzle 44 disposed to impart working fluid tangentially to only a single side of the disks 46. At least the interior of the case 42 can be round in cross section, and the working fluid can exit the turbine 12 through an exhaust port in the endplate 52.

The rotating mechanical energy produced by the rotating turbine shaft 48 can be harvested, such as by being converted to electrical energy by an alternator arrangement. A separate alternator (not shown) could in theory be provided. Alternatively, as FIG. 4 shows, the alternator components can be incorporated into the turbine casing 42. A stator 58 can be retained in a stationary disposition within the casing 42, and a rotor 60 can be retained to rotate with the shaft 48. The rotor 60 has magnets 64 retained relative thereto, and the stator 58 has a set of coils 62 in proximity to the rotor 60. Under this arrangement, rotation of the turbine shaft 48 will yield a rotation of the rotor 60. As the rotor 60 turns, the magnetic field of the rotor magnet 64 sweeps through the stator winding coils 62 to producing an alternating electrical current in the coils 62. That electrical current can be passed through wiring 66 to be otherwise exploited or stored.

In one contemplated embodiment, again as best seen in FIG. 9, the end cap 51 at the first end of the turbine 12 canoperate as the stator 58 by having the coils 62 radially spaced on the inside face of the end cap 51. The coils 62 could be coupled to the end cap 51 in any appropriate manner. For example, a bed of epoxy or other adhesive material could be applied to the proximal face of the end cap 51, the coils 62 could then be applied thereto, and, possibly, the interstitial adhesive could be removed. The wiring 66 can pass directly through apertures in the end cap 51.

The rotor 60 can again be founded on a flat plate. A plurality of boreholes, which can extend partially or entirely through the plate, can be formed in the plate in a radially spaced configuration. The magnets 64 can be received into the boreholes and retained thereto in any effective manner, including, by way of example, press fitting, mechanical fasteners, adhesive, or any combination thereof. The magnets 64 can be disposed to be level with the distal face of the plate, possibly with a finishing operation to present a flat distal surface. In certain cases, a protective disk, which could be formed from a non-conductive metal, can overly the magnets 64 and the plate.

With certain details and alternatives of the present invention for a thermo-electric engine disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims are intended to define the scope of protection to be afforded to the inventors. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

We claim as deserving the protection of Letters Patent:

1. A thermo-electric engine with a working fluid operative in a closed Rankine cycle to enable a harvesting energy from an external source of thermodynamic energy comprising the Sun, the thermo-electric engine comprising:
   a solar energy collector;
   a turbine fluidically coupled to the solar energy collector for receiving working fluid from the solar energy collector wherein the turbine has a rotatably retained turbine shaft for being rotated by the working fluid;
   a return conduit for returning working fluid to the solar energy collector from the turbine;
   an alternator for converting a rotation of the turbine shaft to electrical energy wherein the alternator comprises a rotor, a plurality of magnets, and a stator and wherein the rotor, the plurality of magnets, and the stator are incorporated into the turbine and wherein the turbine has a turbine casing, wherein the stator is fixed relative to the turbine casing, and wherein the rotor is retained to rotate with the turbine shaft, wherein the plurality of magnetsare retained by the rotor, wherein the stator retains a set of winding coils in proximity to the rotor, wherein the turbine casing has an end cap, wherein the end cap comprises the stator of the alternator, and wherein the winding coils are radially spaced on an inside face of the end cap.

2. The thermo-electric engine of claim 1 further comprising a water supply line in thermodynamic communication with the working fluid wherein the water supply line provides building supply water to the thermo-electric engine and further comprising a building water return line for returning heated building supply water.

3. The thermo-electric engine of claim 1 wherein the working fluid comprises a refrigerant.

4. The thermo-electric engine of claim 1 further comprising a pump fluidically interposed between the turbine and the solar energy collector.

5. The thermo-electric engine of claim 1 wherein the turbine comprises a Tesla turbine.

6. The thermo-electric engine of claim 1 wherein the turbine is disposed above the solar energy collector.

7. The thermo-electric engine of claim 1 wherein working fluid enters the turbine as a vapor and further comprising an insulated manifold and a vapor line fluidically interposed between the turbine and the solar energy collector to pass working fluid from the solar energy collector to the turbine.

8. The thermo-electric engine of claim 1 wherein the working fluid comprises an organic fluid.

9. The thermo-electric engine of claim 1 wherein the turbine has a plurality of disks retained to rotate with the turbine shaft and wherein the disks are disposed to receive the working fluid thereon.

10. The thermo-electric engine of claim 9 wherein the turbine is unidirectional and wherein working fluid is received tangentially to only a single side of the disks.

11. The thermo-electric engine of claim 1 wherein the thermodynamic efficiency of the Rankine cycle is determined according to the Equation:

$$\eta_{therm} = \frac{\dot{W}_{turbine} - \dot{W}_{pump}}{\dot{Q}_{in}} \approx \frac{\dot{W}_{turbine}}{\dot{Q}_{in}}$$

Where:
$\dot{Q}$ Is the heat flow rate to or from the system (energy per unit time);
$\dot{W}$ Is the Mechanical power consumed by or provided to the system (energy per unit time); and
$\eta_{therm}$ Is the thermodynamic efficiency of the process (net power output per heat input, dimensionless).

12. The thermo-electric engine of claim 11 wherein the net power output for the thermo-electric engine is determined according to the equations:

$$\dot{W}_{cycle} = \dot{W}_i - \dot{W}_p$$

$$\dot{W}_i = \dot{m}(h_1 - h_2) = \dot{m}(259.1 - 229.6)\frac{kJ}{kg}$$

$$\Rightarrow \dot{W}_i = 29.5 \cdot \dot{m}\frac{kJ}{kg}$$

$$\dot{W}_p = \dot{m}(h_4 - h_3) = \dot{m}(77.3 - 77.3)\frac{kJ}{kg}$$

$$\Rightarrow \dot{W}_p = 0$$

$$\boxed{\Rightarrow \dot{W}_{cycle} = 29.5 \cdot \dot{m}\frac{kJ}{kg}}$$

13. The thermo-electric engine of claim 12 wherein the thermal efficiency of the thermo-electric engine is determined employing the equations:

$$\eta = \frac{\dot{W}_{cycle}}{\dot{Q}_{in}}$$

Where $\dot{Q}_{in} = \dot{m} \cdot (h_1 - h_4) = \dot{m} \cdot (259.2 - 77.3)\frac{kJ}{kg}$ $$\dot{Q}_{in} = 181.9 \cdot \dot{m}\frac{kJ}{kg}$$

$$\eta = \frac{\dot{W}_{cycle}}{\dot{Q}_{in}} = \frac{29.5 \cdot \dot{m}}{181.9 \cdot \dot{m}}$$

$$\boxed{\Rightarrow \eta = 0.162 = 16.2\%}$$

\* \* \* \* \*